(12) United States Patent
Rausch et al.

(10) Patent No.: US 8,295,774 B1
(45) Date of Patent: Oct. 23, 2012

(54) METHODS AND APPARATUSES FOR PROVIDING A STABLE WIDEBAND NOISE SIGNAL

(75) Inventors: Walter F. Rausch, Shawnee, KS (US);
Douglas A. Hyslop, Vienna, VA (US);
David A. Maples, Manassas, VA (US);
Ivy Y. Kelly, Overland Park, KS (US)

(73) Assignee: Clearwire IP Holdings LLC, Bellevue, WA (US)

( * ) Notice: Subject to any disclaimer, the term of this patent is extended or adjusted under 35 U.S.C. 154(b) by 1333 days.

(21) Appl. No.: 11/960,511

(22) Filed: Dec. 19, 2007

(51) Int. Cl.
*H04B 17/00* (2006.01)

(52) U.S. Cl. .................... 455/67.11; 455/82; 455/562.1; 455/575.7; 455/341; 455/561; 330/124 D; 330/124 R; 343/844; 343/853; 343/797; 343/702; 333/100; 333/101; 333/124; 370/275; 370/280; 370/294

(58) Field of Classification Search .................... 455/78, 455/80, 82, 83, 88, 291, 293, 561, 115, 562.1, 455/575.7, 341; 330/124 D, 124 R; 343/844, 343/853, 797, 702; 333/100, 101, 124; 370/275, 370/280, 294
See application file for complete search history.

(56) References Cited

U.S. PATENT DOCUMENTS

| | | | | |
|---|---|---|---|---|
| 6,011,979 A * | 1/2000 | Schwengler | ................... | 455/561 |
| 6,169,451 B1 * | 1/2001 | Kim | .......................... | 330/124 D |
| 6,223,056 B1 * | 4/2001 | Appel | .......................... | 455/561 |
| 6,560,465 B1 * | 5/2003 | Han | .......................... | 455/67.11 |
| 6,640,111 B1 * | 10/2003 | Shapira | ....................... | 455/562.1 |
| 6,931,261 B2 * | 8/2005 | Waylett et al. | ................ | 455/561 |
| 7,146,192 B2 * | 12/2006 | Cooper et al. | ............. | 455/562.1 |
| 2003/0040335 A1 * | 2/2003 | McIntosh et al. | ............. | 455/561 |
| 2004/0253985 A1 * | 12/2004 | Cooper et al. | ............. | 455/562.1 |
| 2005/0208912 A1 * | 9/2005 | Kapoor et al. | ................ | 455/130 |
| 2005/0208974 A1 * | 9/2005 | Tripathi | ........................ | 455/561 |
| 2006/0098632 A1 * | 5/2006 | Johnson | ........................ | 370/352 |

* cited by examiner

*Primary Examiner* — April G Gonzales
(74) *Attorney, Agent, or Firm* — McDonnell Boehnen Hulbert & Berghoff LLP

(57) ABSTRACT

Methods and apparatuses for determining uplink receive signal path characteristics in a wireless communication system are disclosed. In one embodiment, a tower-top noise source (TTNS) is provided such that it is permanently affixed in close proximity to a receive antenna. The TTNS preferably has an output that includes a wideband noise signal having predetermined characteristics. The TTNS output is selectively connected to a receive signal path that includes a tower-top low-noise amplifier (TTLNA). An altered version of the wideband noise signal is received at the output of the receive signal path, and a characteristic of the altered wideband noise signal is measured.

20 Claims, 6 Drawing Sheets

METHODS AND APPARATUSES FOR PROVIDING A STABLE WIDEBAND NOISE SIGNAL

FIELD OF THE INVENTION

The present invention relates to wireless communications and, more particularly, to determining uplink receive signal path characteristics in a wireless communication system.

BACKGROUND

A given cellular communications system typically includes a base transceiver station (BTS) that provides service to one or more mobile stations within the coverage area of the BTS. The BTS may include a radio antenna system having one or more antennas mounted on a tower. A given antenna may transmit downlink signals to and/or receive uplink signals from mobile stations serviced by the BTS. Further, the radio antenna system may also include a tower-top low-noise amplifier (TTLNA) and feedline system (collectively, a receive signal path). The TTLNA amplifies signals received from the antenna (i.e., uplink signals), and the feedline system is used to transmit an amplified signal from the tower top to the BTS location at the base of the tower.

It is standard practice to calibrate and otherwise validate the integrity of the TTLNA and feedline system. This may be accomplished by injecting a wideband noise signal of known characteristics into the TTLNA at the top of the tower, and then reading the characteristics of the transported signal at the BTS location at the base of the tower. This diagnostic procedure may help determine the gain of the TTLNA, the loss of the feedline system, and other information about the radio antenna system. If the signal received at the BTS location does not conform to the original engineering design specifications for the radio antenna system, then the TTLNA gain may be adjusted and/or feedline system may be repaired or replaced accordingly.

To inject a wideband noise signal of known characteristics into the TTLNA at the top of the tower, a test signal or noise source is required. However, current practice may require a technician to physically climb to the top of the tower with test equipment to inject the wideband noise signal into the TTLNA. Requiring a technician to climb to the top of the tower may be labor intensive, time-consuming, and dangerous. Alternatively, an additional feedline may be run from the TTLNA to the base of the tower or BTS location. The additional feedline allows these tests to be run without requiring a technician to climb to the tower top. Although saving a tower climb, this diagnostic procedure has several disadvantages. For instance, the additional feedline (i) is an additional installation expense, (ii) is an additional weight load on the tower, (iii) is an additional monthly lease expense, and (iv) can develop faults of its own, thereby incorrectly indicating a problem in the radio antenna system. Further, a technician must travel to the tower top to attach the additional feedline to the TTLNA.

SUMMARY

Methods and apparatuses for determining uplink receive signal path characteristics in a wireless communication system are disclosed. In particular, a noise source and associated components are disclosed that eliminate the need for a technician to climb to the tower top to introduce a wideband noise signal into the TTLNA, or for an additional feedline to be coupled to the TTLNA.

In accordance with a method, in one embodiment, a tower-top noise source (TTNS) is provided such that it is permanently affixed in close proximity to a receive antenna. The TTNS preferably has an output that includes a wideband noise signal having predetermined characteristics. The TTNS output is selectively connected to a receive signal path that includes a TTLNA. An altered version of the wideband noise signal is received at the output of the receive signal path, and a characteristic of the altered wideband noise signal is measured.

In one embodiment, the TINS includes a diode that is reverse biased beyond its junction breakdown voltage. In another embodiment, the temperature of the diode is regulated.

In other embodiments, the step of providing the TTNS includes generating a noise signal and filtering the noise signal to generate the wideband noise signal. In another embodiment, the noise signal is isolated using a buffer amplifier. In yet other embodiments, the step of providing the TTNS includes collocating the TTNS and the TTLNA.

In some embodiments, the step of selectively connecting the TINS output to the receive signal path is preferably performed by a tower-top controller (TTC) communicatively coupling the TTNS output to the receive signal path. Preferably, the TTC is remotely controlled. In another embodiment, the receive signal path further includes a radio frequency coaxial cable extending from the TTLNA to the BTS location.

In one embodiment, measuring the characteristic of the altered version of the wideband noise signal includes measuring at least one of a power level and a frequency response characteristic. In another embodiment, the predetermined characteristics of the wideband noise signal may include at least one of a power level and a frequency bandwidth.

In accordance with an apparatus, in an embodiment, the apparatus includes a TTNS permanently affixed in close proximity to a receive antenna. The TTNS is preferably operable to output a wideband noise signal that has predetermined characteristics. The apparatus includes a receive signal path that includes a TTLNA and an output. The apparatus also includes a TTC for selectively connecting the TTNS output to the receive signal path, and a measuring device that is connected to the receive signal path output and operable to measure a characteristic of an altered version of the wideband noise signal produced at the receive signal path output.

In an embodiment, the TTC is preferably remotely controlled. In another embodiment, the TTNS includes a diode that is reverse biased beyond its junction breakdown voltage. In yet another embodiment, the TTNS includes a temperature compensator unit adaptable to regulate the temperature of the diode.

These as well as other aspects and advantages will become apparent to those of ordinary skill in the art by reading the following detailed description, with appropriate reference to the accompanying drawings.

BRIEF DESCRIPTION OF THE DRAWINGS

Embodiments of the invention are described herein with reference to the drawings, in which.

DETAILED DESCRIPTION

Figure 1:
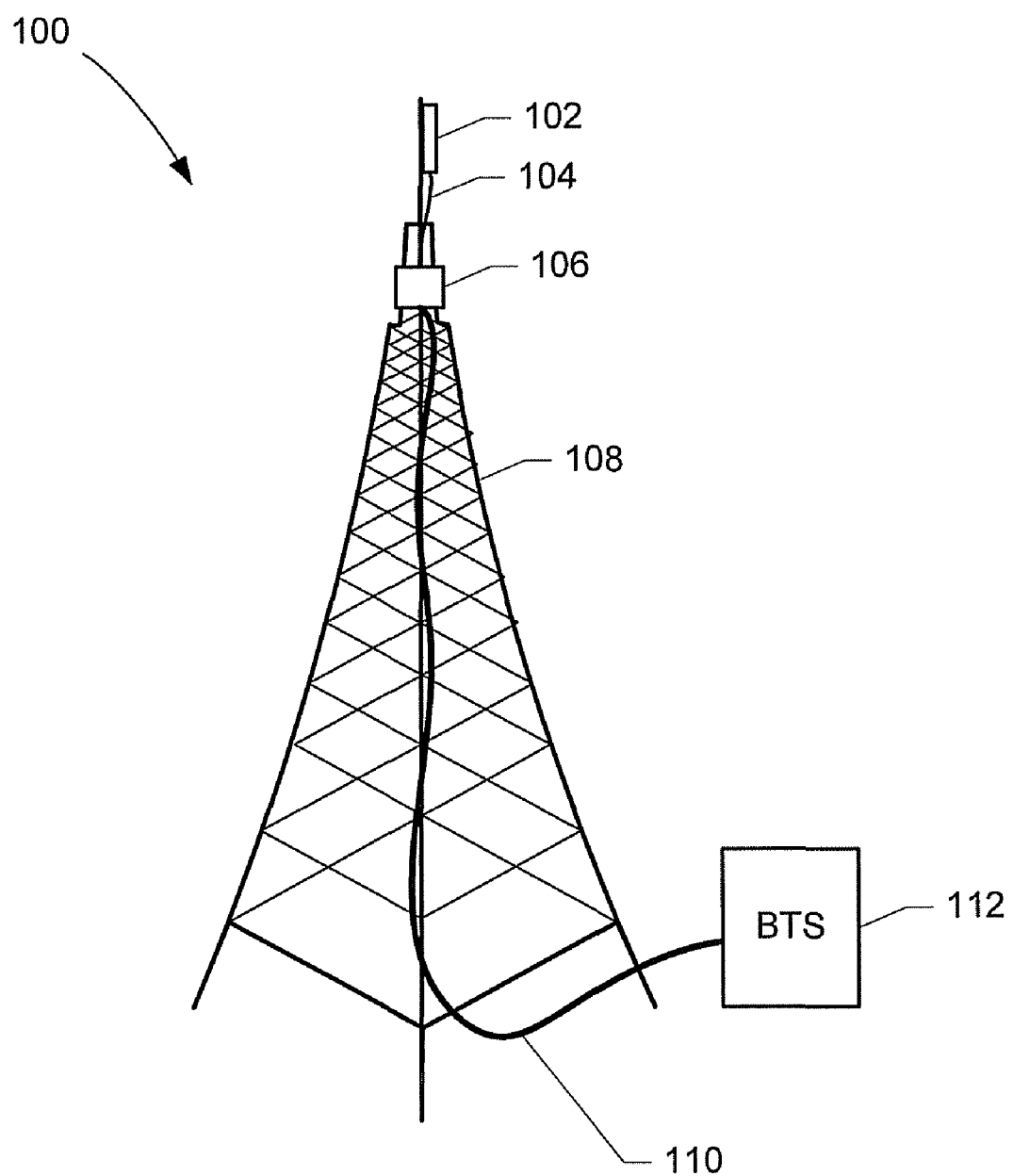
FIG. 1 is a block diagram depicting a radio antenna system.

FIG. 1 is a block diagram depicting a radio antenna system 100 for use in carrying out an embodiment of the invention. As illustrated, the radio antenna system 100 includes a receive antenna 102, a cable 104, tower-top equipment 106, a tower 108, a feedline 110, and a BTS 112.

In normal operation, the receive antenna 102 receives uplink signals from devices in communication with the radio antenna system 100. The receive antenna 102 may be operable to only receive uplink signals, or may be operable to both receive uplink signals and transmit downlink signals. Additionally, the receive antenna 102 may include a plurality of antennas.

Figure 2:
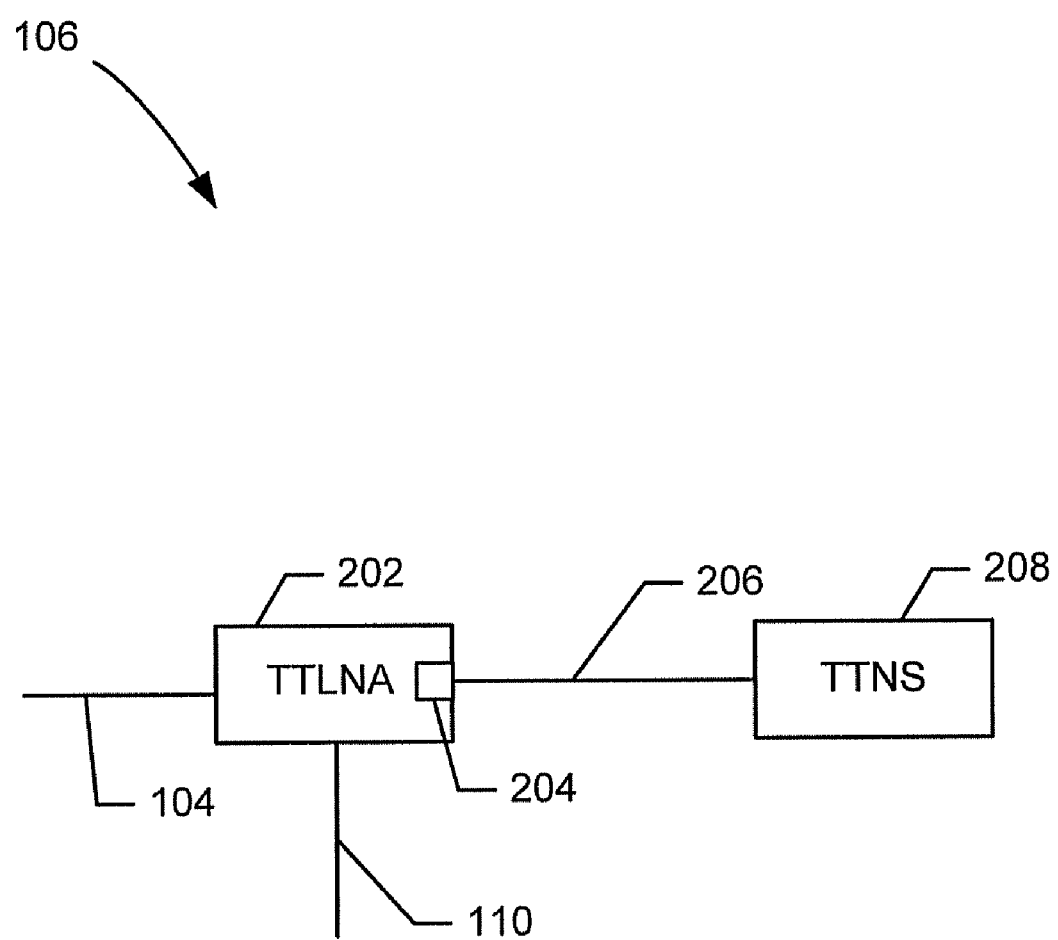
FIG. 2 is a block diagram depicting tower-top equipment.

A given uplink signal received by the receive antenna 102 is transmitted to the tower-top equipment 106 via the cable 104. FIG. 2 is a block diagram depicting tower-top equipment 106 for use in carrying out an embodiment of the invention. As illustrated, the tower-top equipment 106 includes a TTLNA 202, a calibration port 204, a cable 206, and a TTNS 208. In normal operation, when the TTLNA 202 receives the uplink signal from the receive antenna 102, the uplink signal is amplified at the TTLNA 202, and then transmitted to the BTS location 112 via the feedline 110. Because the strength of a signal attenuates as the signal travels through the feedline 110, the BTS location 112 receives an altered version of the amplified uplink signal.

It is desirable to periodically test the integrity of the TTLNA 202 and feedline 110 system. Specifically, it may be desirable to calibrate the gain of the TTLNA 202 to ensure the TTLNA 202 is sufficiently amplifying the received signals. In the mode where the TTLNA 202 and/or feedline 110 are tested (i.e., the test mode), the TTNS 208 sends a wideband noise signal to the TTLNA 202 via the calibration port 204 of the TTLNA 202. Although the TTLNA 202 is depicted to receive the wideband noise signal via the calibration port 204, a separate port for receiving the wideband noise signal may not be necessary, and may be omitted altogether. Nonetheless, while receiving the wideband noise signal, the TTLNA 202 may be configured to temporarily disconnect the signal path to the receive antenna 102. Temporarily disconnecting the signal path to the receive antenna 102 ensures the TTLNA 202 does not receive uplink signals from the receive antenna 102 while in test mode.

Once at the TTLNA 202, the wideband noise signal is amplified, and then transmitted to the BTS location 112 via the feedline 110. Because the wideband noise signal may experience loss while being transmitted through the feedline 110, an altered version of the wideband noise signal is received at the BTS location 112.

One or more characteristics of the altered wideband noise signal may then be measured. The characteristic(s) of the altered wideband noise signal may be measured in a variety of locations. For instance, the characteristic(s) may be measured at the BTS location 112. At the BTS location 112, pre-installed equipment may be used to measure the characteristic(s) of the altered wideband noise signal, such as a power meter. In one embodiment, the Receive Signal Strength Indicator (RSSI) measurement capability of the BTS equipment may be used. Alternatively, the characteristic(s) may be measured by test equipment specifically installed for measuring the characteristic(s), and the test equipment may be connected to the feedline via a 10 dB down tap, or a 20 dB down tap, for instance. Additionally, rather than being measured at the BTS location 112, the characteristic(s) may be measured outside of the BTS location 112, such as along the feedline 110. In such a case, test equipment used to measure the characteristic(s) may be installed along the feedline 110. Other examples and measuring devices for measuring one or more characteristics of the altered version of the wideband signal are also possible.

Figure 3:
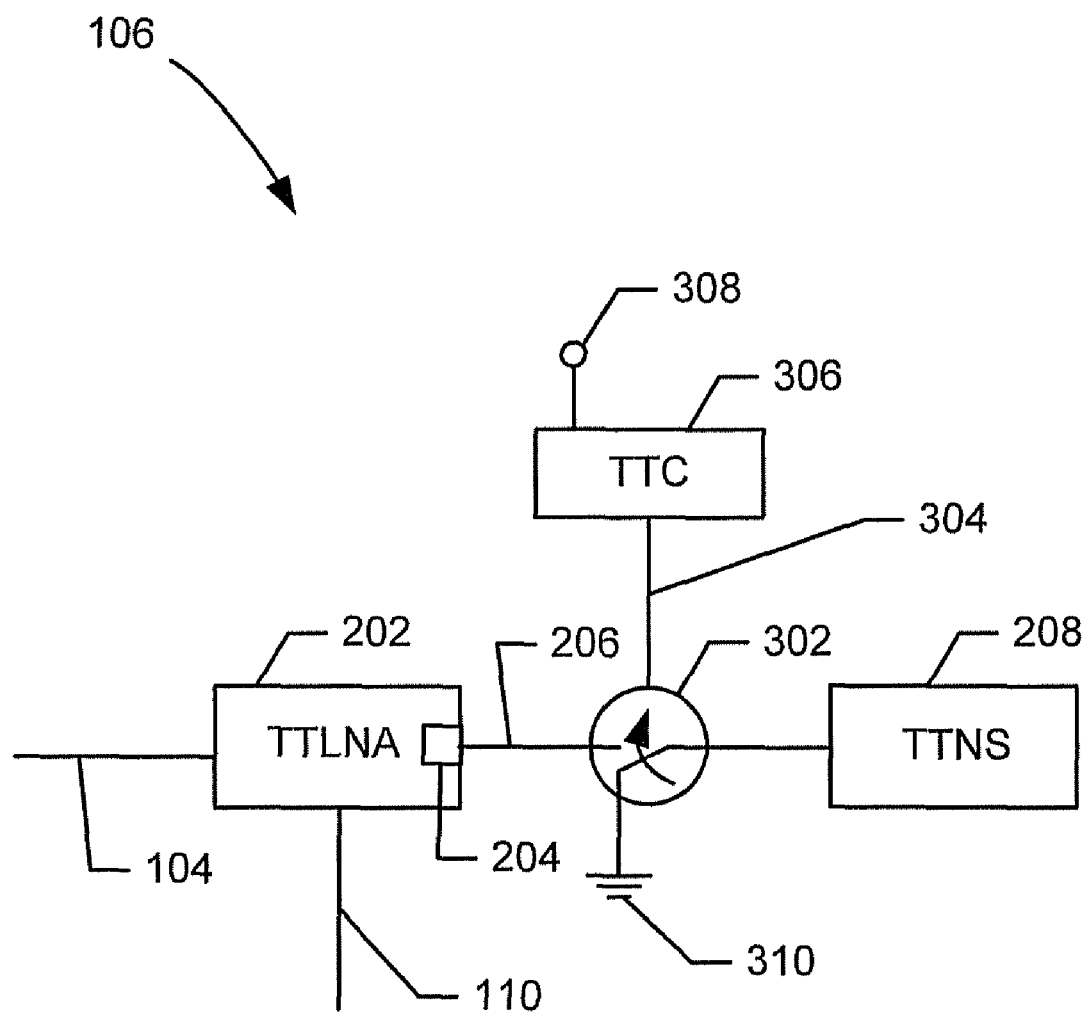
FIG. 3 is a block diagram depicting tower-top equipment.

The process of the TTNS 208 sending a wideband noise signal to the TTLNA 202 may be implemented in a variety of ways. For instance, FIG. 3 is a block diagram depicting tower-top equipment 106 for use in carrying out an embodiment of the invention. As illustrated, the tower-top equipment 106 includes the TTLNA 202, the calibration port 204, the cable 206, a switch 302, the TTNS 208, a cable 304, and a tower-top controller (TTC) 306. According to FIG. 3, the TTC 306 is communicatively coupled to the switch 302 via the cable 304. The switch 302 may take a variety of configurations (e.g., an RF switch), and the TTC 306 may control the operation of the switch 302.

Control of the TTC 306 may take of any of a variety of configurations. For example, as shown in FIG. 3, the TTC 306 may include a TTC antenna 308, which allows the TTC 306 to be remotely controlled. In operation, via the TTC antenna 308, the TTC 306 may receive wireless signals in any of a variety of protocols. As another example, the TTC 306 may be remotely controlled via a cable. The cable may include a separate cable, or may be shared with feedline 110. If shared with feedline 110, the cable may be isolated in frequency from any BTS 112 signals, and appropriately coupled to and decoupled from the feedline 110 using standard "Bias-Tee" devices. Of course, other examples exist for controlling operation of the TTC 306.

As noted above, in normal operation, the receive antenna 102 passes received uplink signals to the TTLNA 202 via the cable 104, and after amplifying an uplink signal, the TTLNA 202 transmits the amplified uplink signal to the BTS location 112 via the feedline 110. While in normal mode, the TTC 306 instructs the switch 302 to attach TTNS 208 to ground 310, and thus inhibits a signal path from being established between the TTNS 208 and the TTLNA 202. As such, in normal operation, the TTLNA 202 receives uplink signals from the receive antenna 102, and does not receive a wideband noise signal from the TTNS 208.

When entering test mode, the TTC 306 causes the switch 302 to move from ground position 310 to form a signal path between the TTNS 208 and the TTLNA 202. In one embodiment, the TTNS 208 remains powered on. Hence, when the TTC 306 orients the switch 302 to establish a connection between TINS 208 and TTLNA 202, the TTLNA 202 receives a wideband noise signal from the TTNS 208 via the calibration port 204. Because the TTC 306 controls the operation of the switch 302, and because the TTC 306 includes the TTC antenna 308, a technician may remotely instruct the TTC 306 how to orient the switch 302. As such, through instructing the TTC 306 via remote commands, the technician may enable the TTNS 208 to provide a wideband noise signal to the TTLNA 202 from a remote location.

Figure 4:
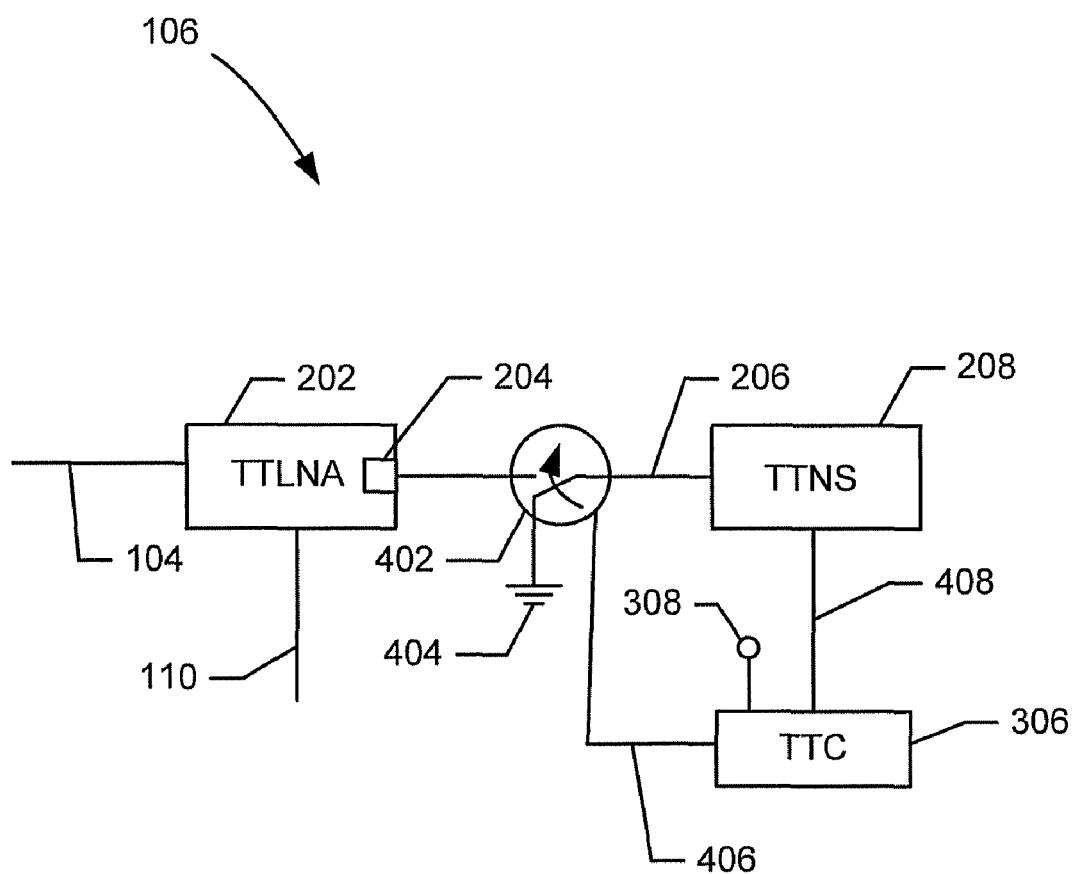
FIG. 4 is a block diagram depicting tower-top equipment.

As another example, FIG. 4 is a block diagram depicting tower-top equipment 106 for use in carrying out an embodiment of the invention. As illustrated, the tower-top equipment 106 includes the TTLNA 202, the calibration port 204, the cable 206, the TTNS 208, a switch 402, a connection to ground 404, a cable 406, the TTC 306, and a cable 408.

In this embodiment, rather than remaining powered on, the TTNS 208 may be powered on and off by the TTC 306. When powered off, the TTNS 208 does not provide a wideband noise signal to the TTLNA 202. On the other hand, when powered on, the TTNS 208 may provide a wideband noise signal to the TTLNA 202. Similar to FIG. 3, the TTC 306 includes the TTC antenna 308, and thus, the TTC 306 may be remotely controlled. Hence, via control TTC 306, a technician may remotely power the TINS 208 on and off, and thus remotely enable the TTNS 208 to provide a wideband noise signal to the TINS 202.

The switch 402 may take any of a variety of configurations. As an example, the switch 402 may include a Single Pole Double Throw ("SPDT") switch. As depicted in FIG. 4, the TTC 306 may be communicatively coupled to the SPDT switch 402 (or switch 402, more generally). When the TTC 306 is instructed to turn off the TTNS 208, the TTC 306 may position the SPDT switch 402 to remove the TTNS 208 from calibration port 204 and thus couple the TTNS 208 to ground 404. This ensures that the wideband noise signal is removed from the calibration port 204 while the TTLNA 202 is operating in normal mode. When the TTC 306 is instructed to power on the TINS 208, the TTC 306 may position the SPDT switch 402 to decouple the TTNS from ground 404 and thus enable the wideband noise signal to be sent from the TTNS 208 to the TTLNA 202 via the calibration port 204.

Figure 5:
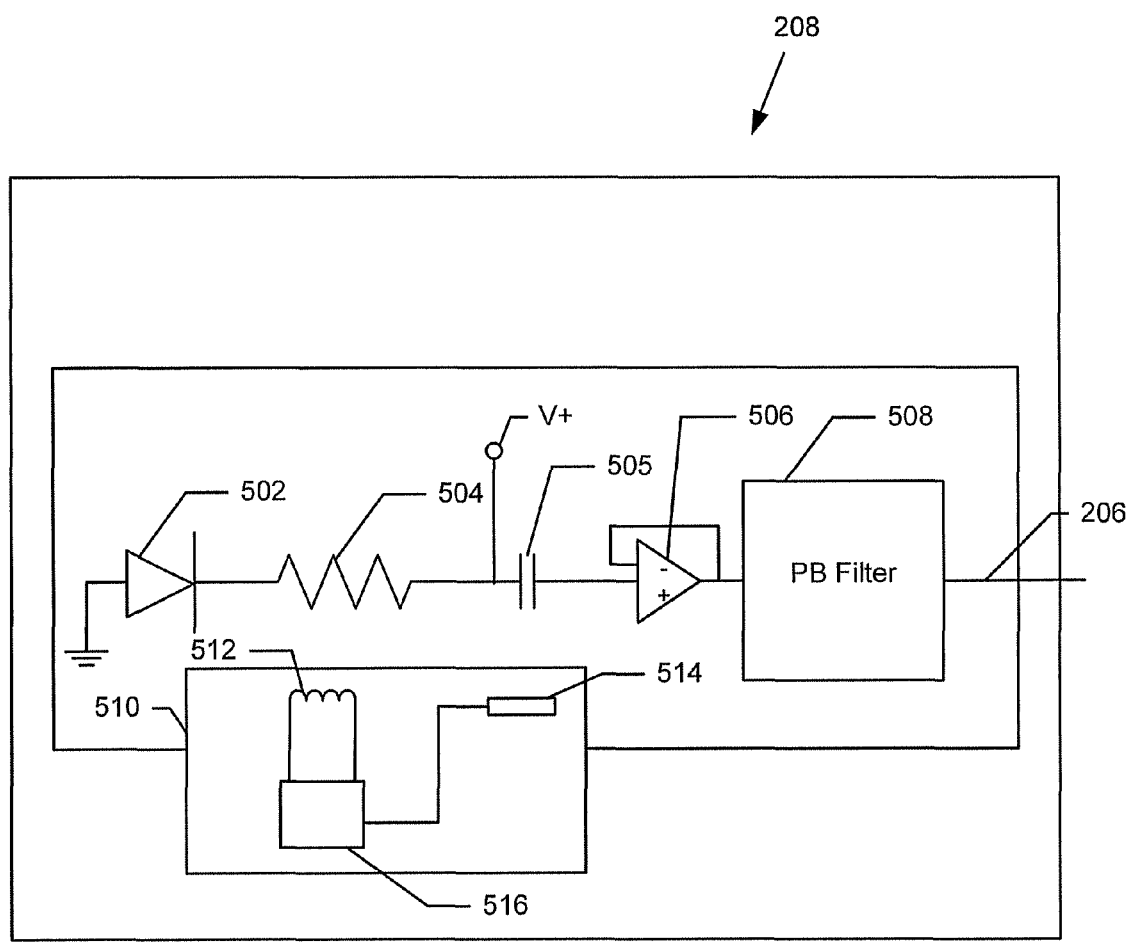
FIG. 5 is a block diagram depicting a tower-top noise source.

The TTNS 208 may take a variety of configurations. For instance, FIG. 5 is a block diagram depicting the TTNS 208 for use in carrying out an embodiment of the invention. As illustrated, the TTNS 208 includes a diode 502, a resister 504 connected in series with the diode 502, a coupling capacitor 505, a buffer amplifier 506, a passband filter 508, and a temperature compensator unit 510. According to FIG. 5, the temperature compensator unit 510 includes a heating element 512, a temperature sensor 514, and a temperature controller 516.

In operation, the diode 502 is reverse biased beyond its junction breakdown voltage. When the diode 502 is biased to such a point, it will conduct a certain amount of current. However, reverse biasing the diode 502 in such a manner may destroy the diode junction, and therefore render the diode inoperable. Connecting the resister 504 in series with the diode 502 will limit the current conducted by the diode 502, thereby protecting the diode 502 from damage. With a sufficient resistance, the junction temperature of the diode 502 may effectively be maintained below a critical level. As such, the diode 502 will not be destroyed, and will provide a source of broadband noise energy (noise signal) that may then be coupled away from the diode 502 and used for calibration purposes.

From the resistor 504, the noise signal may then be fed, via the coupling capacitor 505, to the buffer amplifier 506 and/or passband filter 508. The buffer amplifier 506 isolates the noise signal from any applied load to stabilize the output of the diode 502. Further, the passband filter 508 filters the noise signal to an energy range of interest. Of course, other devices may be used to isolate and/or filter the noise signal. This configuration (e.g., diode 502, resistor 504, coupling capacitor 505, buffer amplifier 506, and passband filter 508) may be used to provide a wideband noise signal suitable for calibration purposes.

However, with the TINS 208 being located in an elevated position, and perhaps outdoors, it may be subject to an extreme range of temperatures. Such a variation in temperature may compromise the reliability of the TINS 208 to produce a stable wideband noise signal. Specifically, variations in temperature may cause fluctuations in the current conducted by the diode 502, perhaps alter the output of each of the buffer amplifier 506 and passband filter 508, and thus affect the output noise power.

As such, the temperature of each of the diode 502, resistor 504, coupling capacitor 505, buffer amplifier 506, and passband filter 508 ("aforementioned devices") may be maintained by the temperature compensator unit 510. The temperature compensator unit 510 may take a variety of configurations. As depicted in FIG. 5, the temperature compensator unit 510 includes a heating element 512, a temperature sensor 514, and a temperature controller 516. The heating element 512 may take a variety of configurations, and may include a plurality of heating elements located in a variety of locations within (and/or outside) the TTNS 208. Likewise, the temperature sensor 514 may also take a variety of configurations, and may also include a plurality of temperature sensors located in a variety of locations within (and/or outside) the TTNS 208.

In operation, the temperature controller 516 may receive a reading of the temperature of the TTNS 208 (i.e., the temperature of each of the aforementioned devices) from the temperature sensor 514. Upon receiving the temperature reading, the temperature controller 516 may determine that the temperature of the TTNS 208 needs to be adjusted. For instance, the temperature controller 516 may determine that the temperature of the TTNS 208 needs to be increased, and may accordingly increase the heat produced by the heating element 510 by increasing the current flow to the heating element 510. As another example, the temperature controller 516 may determine that the temperature of the TTNS 208 needs to be decreased, and may accordingly reduce the heat produced by the heating element 510 by reducing the current flow to the heating element 510. As such, the temperature compensator unit 510 maintains the temperature of the TTNS 208 so it can produce a stable wideband noise signal. Of course, the temperature compensator unit 510 may regulate the temperature of the TTNS 208 in other ways as well.

Figure 6:
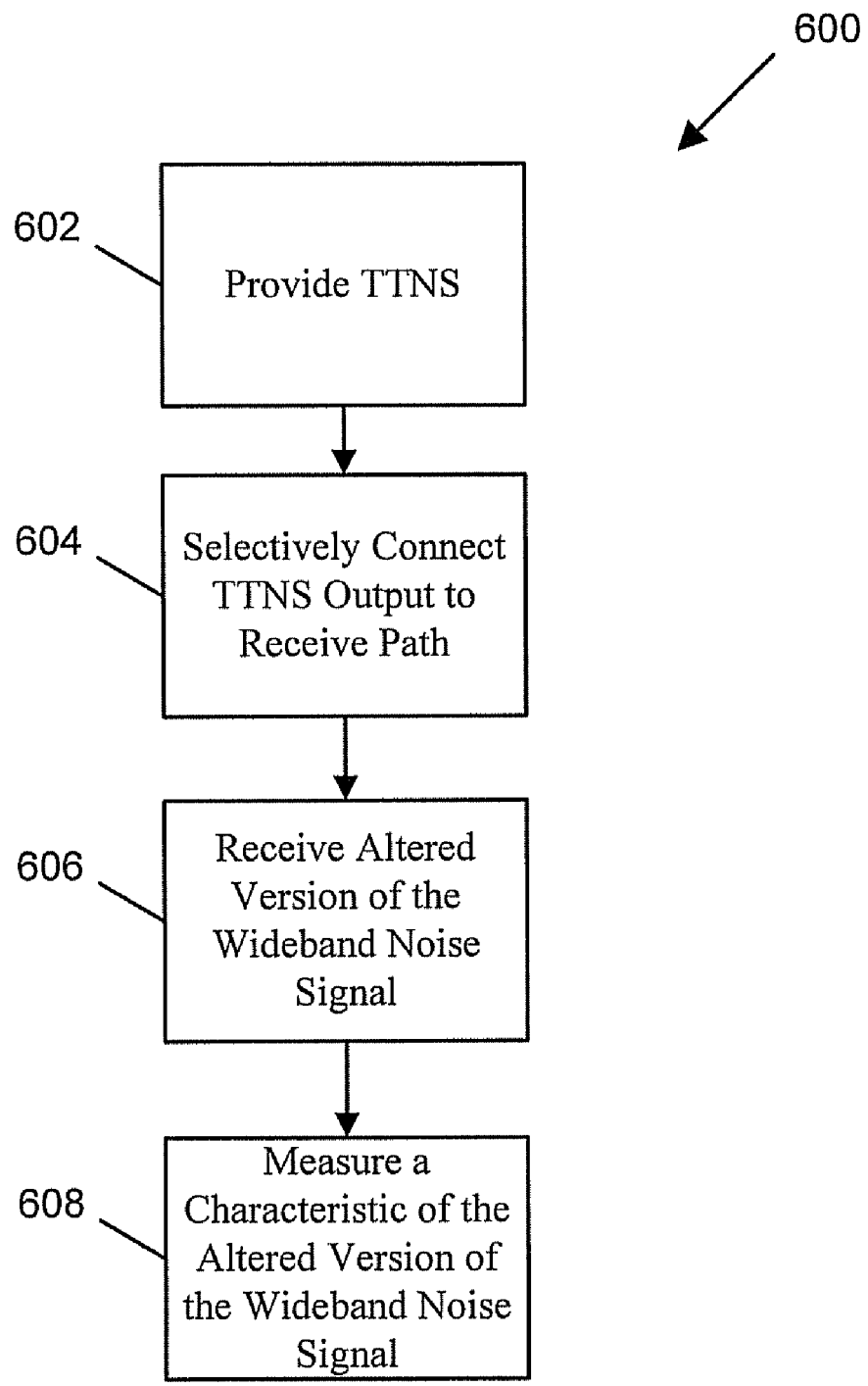
FIG. 6 is a flow chart provided to illustrate some of the functions that may be carried out in accordance with an embodiment of the invention.

FIG. 6 is a flow chart provided to illustrate some of the functions that may be carried out in accordance with an embodiment of the invention. According to FIG. 6, at block 602, the TTNS 208 is provided such that it is permanently affixed in close proximity to the receive antenna 102. The TTNS 208 preferably has an output that includes a wideband noise signal having predetermined characteristics. Next, at block 604, the TTNS 208 output is selectively connected to a receive signal path that includes the TTLNA 202. At block 606, an altered version of the wideband noise signal is received at the output of the receive signal path. Next, at block 608, a characteristic of the altered wideband noise signal is measured.

At block 602, a TTNS 208 is provided such that it is permanently affixed in close proximity to the receive antenna 102. Although illustrated in FIG. 1 to be on top of the tower 108, and even designated as a 'tower-top' noise source, the TTNS 208 need not be located at a tower top, or even at a tower. Rather, the TTNS 208 is preferably located in close proximity to the receive antenna 102. For instance, the receive antenna 102 may be located on top (or near the top) of a building, or any other elevated structure. In such a case, the TTNS 208 may also be located at the top (or near the top) of the building or elevated structure as well.

Additionally, 'close proximity' may include a variety of distances. For instance, the TTNS 208 being affixed in close proximity to the receive antenna 102 may include the TTNS 208 being affixed adjacent to the receive antenna 102, or being affixed up to fifty feet away from the receive antenna 102. Further, the TTNS 208 may be affixed below or above the receive antenna 102. Other examples of distances and elevations defining 'close proximity' also exist.

Further, the TTNA 208 may be permanently affixed in a variety of ways. For instance, the TTNA 208 may be affixed using nuts, bolts, and/or a clamp, for instance. Additionally, the TTNA 208 is permanently affixed so long as it is securely fastened, even though the TTNA 208 may be easily removed and relocated elsewhere.

In one embodiment, the step of providing the TTNS 208 may include collocating the TTNS 208 and the TTLNA 202. For example, collocating the TTNS 208 and the TTLNA 202 may include locating the TINS 208 adjacent to the TTLNA 202, locating the TTNS 208 up to fifty feet away from the TTLNA 202, or even locating the TTNS 208 within the TTLNA 202. Other examples exist for collocating the TTNS 208 and the TTLNA 202 as well.

In another embodiment, the step of providing the TTNS 208 may include generating a noise signal and filtering the noise signal to generate the wideband noise signal. A variety of devices may be used to generate the noise signal, and a variety of devices may be used to filter the noise signal as well. For instance, a diode 502, which is reverse biased beyond its breakdown voltage, may be used to generate the noise signal, and a passband filter 508 may be used to filter the noise signal. In another embodiment, the step of providing the TINS 208 may include isolating the noise signal using a buffer amplifier 506. Other devices may be used to isolate the noise signal as well.

Further, the TTNS 208 may take a variety of configurations. For instance, the TINS 208 may include a diode 502 that is reverse biased beyond its junction breakdown voltage. In an embodiment, a resister 504 may be connected in series with the diode 502 to limit the current conducted by the diode 502. When the diode 502 is reverse biased in such a manner, it will provide a source of broadband noise energy (noise signal) that may then be coupled away from the diode 502 and used for calibration purposes.

From the resistor 504, the noise signal may then be fed, via the coupling capacitor 505, to the buffer amplifier 506 and/or passband filter 508. The buffer amplifier 506 isolates the noise signal from any applied load to stabilize the output of the diode 502. Further, the passband filter 508 filters the noise signal to an energy range of interest. Of course, other devices may be used to isolate and/or filter the noise signal. This configuration (e.g., diode 502, resistor 504, coupling capacitor 505, buffer amplifier 506, and passband filter 508) may be used to provide a wideband noise signal suitable for calibration purposes.

In an embodiment, the temperature of the diode 502 and each of the other associated devices (the TTNS 208, more generally) is regulated, and the temperature of the diode 502 may be regulated by a variety of devices. For instance, a temperature compensator unit 510 may be used. As depicted in FIG. 5, the temperature compensator unit 510 includes the heating element 512, the temperature sensor 514, and the temperature controller 516.

Furthermore, the TTNS 208 preferably has an output that includes a wideband noise signal having predetermined characteristics. The predetermined characteristics of the wideband noise signal may include a power level and/or a frequency bandwidth, for instance. Other examples of predetermined characteristics also exist.

Next, at block 604, the TTNS 208 output is selectively connected to a receive signal path. The receive signal path includes the TTLNA 202, and may also include a radio frequency coaxial cable (e.g., feedline 110) extending from the TTLNA 202 to the BTS location 112. Of course, the receive path may include other devices and equipment as well.

Selectively connecting the TTNS 208 output to the receive signal path may include the TTC 306 communicatively coupling the TTNS 208 output to the receive signal path. For instance, according to FIG. 3, the TTC 306 is communicatively coupled to the switch 302 via the cable 304, and may control the operation of the switch 302. Further, the TTC 306 may include a TTC antenna 308, which allows the TTC 306 to be remotely controlled.

As noted above, in normal operation, the receive antenna 102 passes received uplink signals to the TTLNA 202 via the cable 104, and after amplifying an uplink signal, the TTLNA 202 transmits the amplified uplink signal to the BTS location 112 via the feedline 110. While in normal mode, the TTC 306 instructs the switch 302 to remain in the grounded position, and thus inhibit a signal path from being established between the TTNS 208 and the TTLNA 202. As such, in normal operation, the TTLNA 202 receives uplink signals from the receive antenna 102, and does not receive a wideband noise signal from the TINS 208.

When entering test mode, the TTC 306 positions the switch 302 to form a signal path between the TTNS 208 and the TTLNA 202. In one embodiment, the TTNS 208 remains powered on. Hence, when the TTC 306 positions the switch 302 to form a signal path between the TTNS 208 and the TTLNA 202, the TTLNA 202 receives a wideband noise signal from the TTNS 208 via the calibration port 204. Because the TTC 306 controls the operation of the switch 302, and because the TTC 306 includes the TTC antenna 308, a technician may remotely instruct the TTC 306 to position the switch 302 to either the grounded or the conducting position. As such, through remotely instructing the TTC 306, the technician may enable the TTNS 208 to provide a wideband noise signal to the TTLNA 202 from a remote location.

As another example, rather than remaining powered on, the TTNS 208 may be powered on and off by the TTC 306. When powered off, the TINS 208 does not provide a wideband noise signal to the TTLNA 202. On the other hand, when powered on, the TTNS 208 may provide a wideband noise signal to the TTLNA 202. As depicted in FIG. 4, the TTC 306 includes the TTC antenna 308, and thus, the TTC 306 may be remotely controlled. Hence, via control of TTC 306, a technician may remotely power the TTNS 208 on and off, and thus remotely enable the TINS 208 to provide a wideband noise signal to the TTNS 202.

Additionally, as depicted in FIG. 4, the TTC 306 may be communicatively coupled to the switch 402. When the TTC 306 is instructed to turn the TTNS 208 off, the TTC 306 may orient the switch 402 to the ground position, and thus remove the wideband noise signal from the calibration port 204 and direct it to ground 404. This ensures that the calibration port 204 receives no wideband noise signal while the TTLNA 202 is operating in normal mode. When the TTC 306 is instructed to power the TINS 208 on, the TTC 306 may also move the switch 402 to attach the wideband noise source to calibration port 204, and thus decouple the TTNS 208 from ground 404 and enable the wideband noise signal to be sent from the TINS 208 to the TTLNA 202.

Next, at block 606, an altered version of the wideband noise signal is received at an output of the receive signal path. The output of the receive signal path may include a variety of locations. For instance, the output of the receive signal path may include the BTS location 112. Alternatively, the output of the receive signal path may include a location along the feedline 110.

Next, at block 608, one or more characteristics of the altered version of the wideband noise signal are measured. Measuring the characteristic(s) of the altered version of the wideband noise signal may include measuring a power level and/or a frequency response characteristic, for instance. Other examples of measuring a characteristic(s) of the altered version of the wideband signal exist as well.

The characteristic(s) of the altered wideband noise signal may be measured in a variety of locations. For instance, the characteristic(s) may be measured at the BTS location 112. At the BTS location 112, pre-installed equipment may be used to measure the characteristic(s) of the altered wideband noise signal, such as a power meter. In one embodiment, the RSSI measurement capability of the BTS equipment may be used. Alternatively, the characteristic(s) may be measured by test equipment specifically installed for measuring the characteristic(s), and the test equipment may be connected to the feedline via a 10 dB down tap, or a 20 dB down tap, for instance. Further, rather than being measured at the BTS location 112, the characteristic(s) may be measured outside of the BTS location 112, such as along the feedline 110. In such a case, test equipment used to measure the characteristic(s) may be installed along the feedline 110. Other examples and measuring devices for measuring one or more characteristics of the altered version of the wideband signal are also possible.

The disclosed methods and apparatuses may be used to determine the gain of the TTLNA 202, the loss of the feedline 110 system, and perhaps other information about the radio antenna system 100. If the signal received at the BTS location 112 does not conform to the original engineering design specifications for the radio antenna system 100, then the TTLNA 202 gain may be adjusted and/or feedline system 110 may be repaired or replaced accordingly.

Exemplary embodiments of the present invention have been described above. Those skilled in the art will understand, however, that changes and modifications may be made to the embodiments described without departing from the true scope and spirit of the present invention, which is defined by the claims.

We claim:

1. A method of determining uplink receive signal path characteristics in a wireless communication system, comprising the steps:
providing a tower-top noise source (TTNS) permanently affixed in close proximity to a receive antenna, the TTNS having a diode that is reverse biased beyond its junction breakdown voltage and an output that includes a wideband noise signal having predetermined characteristics;
selectively connecting the TTNS output to a receive signal path, the receive signal path comprising a tower-top low-noise amplifier (TTLNA);
receiving an altered version of the wideband noise signal at an output of the receive signal path; and
measuring a characteristic of the altered version of the wideband noise signal to facilitate an evaluation of an uplink receive signal path characteristic.

2. The method of claim 1, wherein the step of providing the TTNS comprises generating a noise signal and filtering the noise signal to generate the wideband noise signal.

3. The method of claim 2, further comprising isolating the noise signal using a buffer amplifier.

4. The method of claim 1, wherein the step of providing the TTNS comprises collocating the TTNS and the TTLNA.

5. The method of claim 1, wherein selectively connecting the TTNS output to the receive signal path comprises a tower-top controller (TTC) communicatively coupling the TTNS output to the receive signal path.

6. The method of claim 5, wherein the TTC is remotely controlled.

7. The method of claim 1, wherein the receive signal path further comprises a radio frequency coaxial cable extending from the TTLNA to a base transceiver station location.

8. The method of claim 1, wherein measuring the characteristic of the altered version of the wideband noise signal comprises measuring at least one of a power level and a frequency response characteristic.

9. The method of claim 1, wherein the predetermined characteristics of the wideband noise signal comprise at least one of a power level and a frequency bandwidth.

10. An apparatus operable to determine uplink receive signal path characteristics in a wireless communication system, the apparatus comprising:
a tower-top noise source (TTNS) permanently affixed in close proximity to a receive antenna, the TTNS operable to output a wideband noise signal that has predetermined characteristics, wherein the TTNS comprises a diode that generates a noise signal and a temperature compensator unit adaptable to regulate the temperature of the diode;
a receive signal path that includes a tower-top low noise amplifier (TTLNA) and an output;
a tower-top controller (TTC) for selectively connecting the TTNS output to the receive signal path; and
a measuring device connected to the receive signal path output and operable to measure a characteristic of an altered version of the wideband noise signal produced at the receive signal path output.

11. The apparatus of claim 10, wherein the TTNS further comprises a passband filter that filters the noise signal to generate the wideband noise signal.

12. The apparatus of claim 11, wherein the TTNS further comprises a buffer amplifier to isolate the noise signal.

13. The apparatus of claim 10, wherein the TTC is remotely controlled.

14. The apparatus of claim 10, wherein the receive signal path comprises a radio frequency coaxial cable extending from the TTLNA to a base transceiver station location.

15. The apparatus of claim 10, wherein the predetermined characteristics of the wideband noise signal comprise at least one of a power level and a frequency bandwidth.

16. A method of determining uplink receive signal path characteristics in a wireless communication system, comprising the steps:
providing a tower-top noise source (TTNS) permanently affixed in close proximity to a receive antenna, the TTNS having a diode that is reverse biased beyond its junction breakdown voltage and an output that includes a wideband noise signal having predetermined characteristics;
selectively connecting the TTNS output to a receive signal path, the receive signal path comprising a tower-top low-noise amplifier (TTLNA);
receiving an altered version of the wideband noise signal at an output of the receive signal path;
measuring a characteristic of the altered version of the wideband noise signal to facilitate an evaluation of an uplink receive signal path characteristic; and
regulating the temperature of the diode.

17. An apparatus operable to determine uplink receive signal path characteristics in a wireless communication system, the apparatus comprising:
a tower-top noise source (TTNS) permanently affixed in close proximity to a receive antenna, the TTNS comprising a diode that is reverse biased beyond its junction breakdown voltage and an output that includes a wideband noise signal having predetermined characteristics;

a receive signal path that includes a tower-top low noise amplifier (TTLNA) and an output configured to receive an altered version of the wideband noise signal;

a tower-top controller (TTC) for selectively connecting the TTNS output to the receive signal path; and a measuring device connected to the receive signal path output and operable to measure a characteristic of the altered version of the wideband noise signal to facilitate an evaluation of an uplink receive signal path characteristic.

18. The apparatus of claim 17, wherein the diode is configured to generate a noise signal, and wherein TTNS further comprises a passband filter that filters the noise signal to generate the wideband noise signal.

19. The apparatus of claim 18, wherein the TTNS further comprises a buffer amplifier to isolate the noise signal.

20. The apparatus of claim 17, wherein the TTC is configured to be remotely controlled.

\* \* \* \* \*